United States Patent [19]

McLellan

[11] Patent Number: 5,067,608

[45] Date of Patent: Nov. 26, 1991

[54] IMPROVEMENTS IN OR RELATING TO LOADING AND UNLOADING APPARATUS

[75] Inventor: William McLellan, Stirling, Scotland

[73] Assignee: Automatic Truck Loading Systems (Europe) Ltd. and Bridon plc, Doncaster, England

[21] Appl. No.: 506,161

[22] Filed: Apr. 9, 1990

[30] Foreign Application Priority Data

Apr. 14, 1989 [GB] United Kingdom ............... 8908430

[51] Int. Cl.$^5$ ............................................. B65G 15/10
[52] U.S. Cl. ................................. 198/817; 198/813; 198/841; 414/520
[58] Field of Search .............. 198/371, 372, 367, 457, 198/813, 817, 818, 841; 414/520, 521

[56] References Cited

U.S. PATENT DOCUMENTS

| | | | |
|---|---|---|---|
| 2,962,152 | 11/1960 | Lathrop | 198/817 |
| 3,272,358 | 9/1966 | Thompson | 414/520 |
| 3,635,328 | 1/1972 | Burkholder | 198/817 |
| 3,878,027 | 4/1975 | Troutner | 198/813 X |
| 4,217,977 | 8/1980 | Tam | 198/817 X |
| 4,730,718 | 3/1988 | Fazio et al. | 198/817 X |

FOREIGN PATENT DOCUMENTS

WO8701996 9/1986 PCT Int'l Appl. .

*Primary Examiner*—Joseph E. Valenza
*Assistant Examiner*—Tuan N. Nguyen

[57] ABSTRACT

A flexible element loading and unloading station in which a number of closed travelling loops are utilized over the top of a platform in such a way that one part of the loop in maximum tension carries the applied load while the other part travelling in the opposite direction is out of contact with the load.

20 Claims, 2 Drawing Sheets

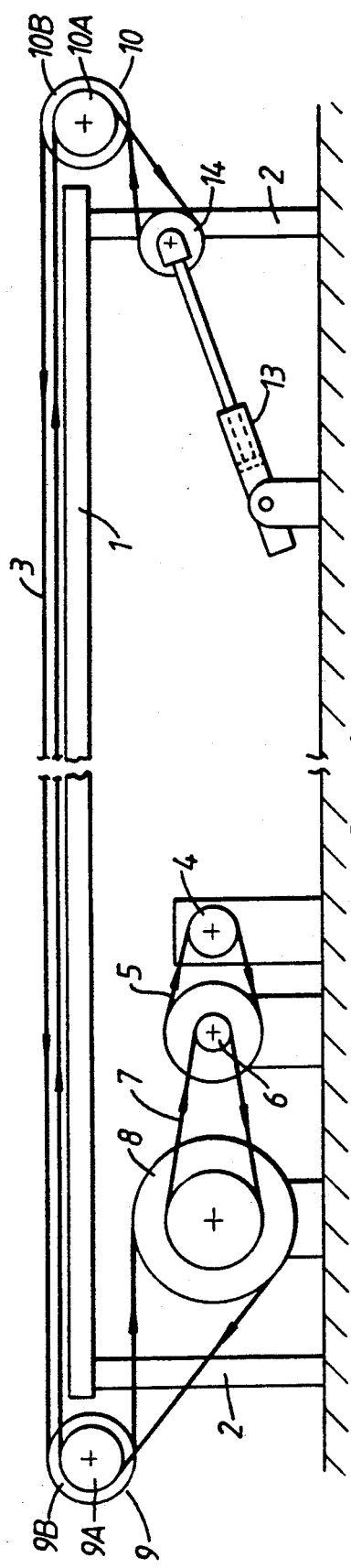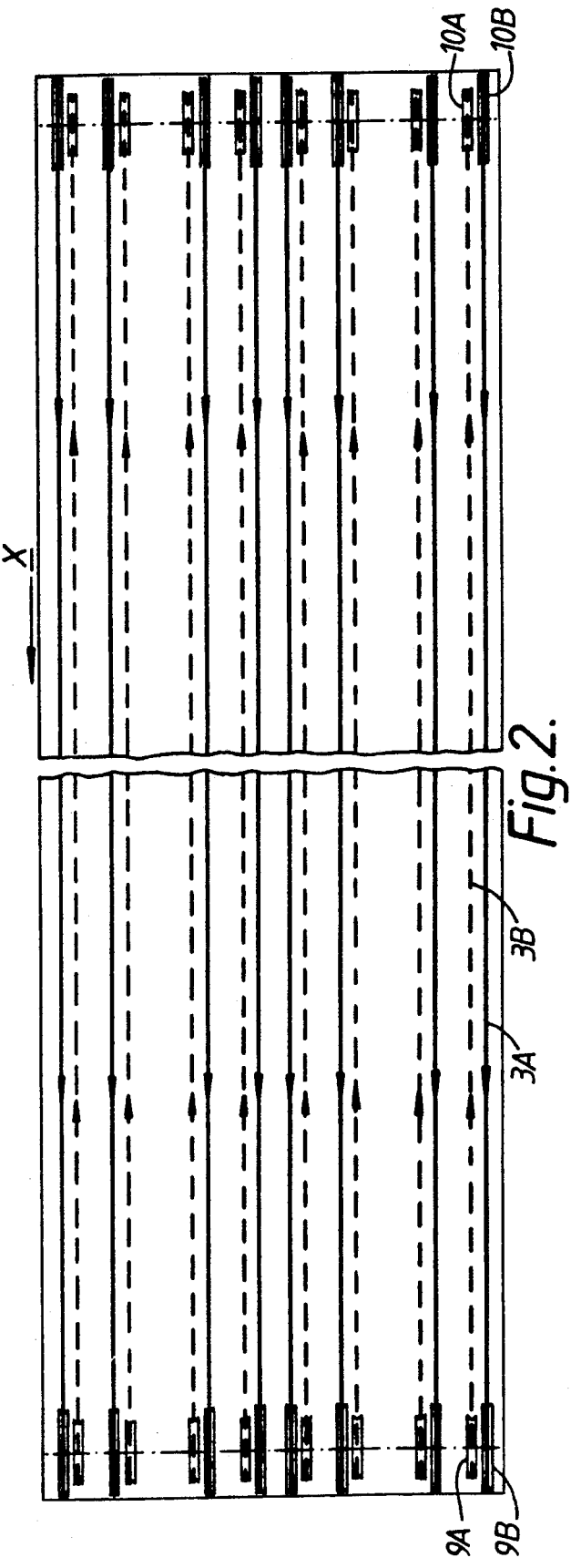

IMPROVEMENTS IN OR RELATING TO LOADING AND UNLOADING APPARATUS

This invention relates to a loading and unloading apparatus particularly, but not exclusively, a transfer apparatus to be provided between the rear of a vehicle and the loading or unloading dock, for example, at a warehouse or distribution center. However, it is to be understood that the apparatus may be used in almost any situation in which loads are required to be moved from one position to another, whether it be to or from a loading dock on the warehouse floor or to or from a railroad car. Likewise, the loading and unloading apparatus may be used with advantage in the hold of a ship or from any form of container, and for loading or unloading cargo from aircraft holds. In all applications, there has to be access for loading and unloading in a substantially horizontal plane.

The apparatus may be used to transfer loads between carriers, for example, vehicle to ship, ship to ship, vehicle to aircraft, etc.

The loading and unloading apparatus according to the invention is not suitable for bulk loads such as grain or asphalt, but is particularly suited to conveying boxed or crated goods on pallets, or freestanding good such as drums, crates or boxes not requiring pallets.

More particularly, this invention relates to a flexible element type of loading and unloading apparatus where the elements are laid to move relative to the platform of the unloading apparatus and convey loads on the moving elements. Flexible elements, for example in particular, wire ropes, are suitable for heavy loads; for lighter loads, chains, wires or plastic or hemp ropes, or the like, may be adequate. Chains are not very suitable since dirt and debris becomes entrapped in them causing jamming, and dirt and grease make them unsuitable for some goods, particularly packaged food stuffs. When the cables are moved along the floor of the loading and unloading apparatus, the loads are supported and carried along by the cables moving relative to the floor which, in turn, supports the cables.

The description relates to a loading and unloading apparatus for placing between the rear of a vehicle and the loading and unloading dock. The apparatus could, with equal facility, be incorporated in the floor of a vehicle. Thus, during a loading or unloading sequence, both the vehicle and the transfer system may have flexible cable loading and unloading system according to the invention. The flexible cable system for the floor of the vehicle may not be in accordance with the present invention but of other known and compatible types.

DESCRIPTION OF BACKGROUND ART

Traditionally, in a vehicle the loads have to be maneuvered towards the rear opening, the vehicle having been backed towards the loading bay, and the loads removed by fork-lift trucks, and vice versa in the case of loading the vehicle. The area between the rear of the vehicle and the warehouse bay and the transfer between them has not been fully addressed as a problem. Transfer apparatus to replace fork-lift trucks assume greater importance with "just in time" deliveries.

More recently, flexible elements, for example, cable systems, as well as moving belts, chain conveyors, and pushing and pulling devices, have been developed for moving loads inside vehicles for unloading on to roller platforms for transferring to or from the loading warehouse bay.

These known arrangements have a number of disadvantages. In Publication No. WO 87/01996 published under the Patent Co-operation Treaty, a flexible element is attached at one end to one side of a bulkhead and at its other end to the other side of the bulkhead. The bulkhead is driven up or down the interior of a vehicle compartment by sprockets engaging in a chain track which extends down both sides of the container. The driven bulkhead moving along the track thus pulls the flexible elements around non-driven pulleys at the front and back end of the container to convey loads towards the back end of the container or front end.

Although the flexible cables are described as endless in this specification, it is clear that they are not since the ends of the cables are joined to the bulkhead and it is the bulkhead that pulls or pushes the cables.

Similarly, in U.S. Pat. No. 4,111,318, a bulkhead is driven along the floor of the container in one direction by a flexible element, in this case a cable being wound round a drum. The bulkhead is returned to the front end of the container by separate return cables being wound up round further drums. No chain drive system is disclosed in this patent specification.

The present invention aims to overcome the disadvantages of having any form of moving bulkhead and overcomes the need for moving the bulkhead by any form of chain drive or the requirement of a bulkhead track. The disadvantage of a chain drive and a track for the bulkhead is very clear in that these tracks or chains may become embedded with dirt and debris, requiring maintenance and lubrication, and may damage or spoil the cargo which would be unacceptable for food containers.

The moving bulkhead which, in fact, provides some of the thrust to move the load and cable together firstly occupies a not inconsiderable space and reduces the volume of the container. The cross-sectional area of the bulkhead may be a large proportion of the cross-section of the container.

When the bulkhead has been driven to the rear, most of the load will have been conveyed to the docking platform, but the last item cannot be pushed on to the platform because of the presence of the bulkhead. It is quite clear that the bulkhead must be stopped before the opening short of any obstruction such as door closing furniture and cannot pass around and underneath the container. This causes a type of problem described in U.S. Pat. No. 4,111,318 where the pusher bar is required to push the last item so that it is completely on the transfer system on the loading dock.

After unloading, the bulkhead has to be pulled or driven back to the front of the container. In U.S. Pat. No. 4,111,318, this is achieved by separate pull-back cables being wound up on drums. The pull-back cables do not carry the load. Separate motors are required for the cables and difficulties in synchronizing their speed of rotation and hence tension of the ropes needs to be dealt with. In the loading mode, therefore, it is necessary to connect the bulkhead to the load so that the moving bulkhead tows loads into the vehicle. In the unloading mode, the movable bulkhead in the most rearward position needs extra pusher mechanisms to push the load towards the rear end of the container and completely on to the transfer system. Cable drive conveyor systems using moving bulkheads are unsuitable for most transfer systems to be placed between the vehicle and the unloading dock.

U.S. Pat. No. 3,272,358 discloses yet another form of cable arrangement for a vehicle floor for discharging particular bulk loads such as asphalt or grain. The material is drawn out of the vehicle by attachment to cables which operate in the floor of the vehicle. U.S. Pat. No. 3,272,358 does not have a moving bulkhead as disclosed in the other two prior art specifications and overcomes problems associated with moving bulkhead systems but introduce further problems. The floor of the vehicle is provided with a number of separate closed loop cables driven directly by a drum and the cables pass along channels in the floor and under the floor on their return path.

While the cables or flexible elements are of the true closed loop type, that is, the ends of each cable are joined together to form a closed loop, this type of system has other disadvantages. In FIGS. 6, 7 and 9 of U.S. Pat. No. 3,272,358, there is disclosed a modification to enable this system to be used for packages or packaged material in contrast to bulk granular materials. One type of closed loop cable is shown in FIG. 9 in which the cable is a single long loop passing round rollers at each end of the vehicle floor, and then on to the next roller, and so on, and eventually this end of this single cable is taken round pulleys and joined in some way to the other end of the cable. This involves very complicated reeving of cables around the pulleys and includes a section where the cable is moving transversely to the other parts of the cable. The cables run under the floor of the vehicle.

As an alternative, U.S. Pat. No. 3,272,358 discloses a number of separate closed loop cables, again passing under the floor of the vehicle. The use of closed loops requires great care in joining the cables or rope or chains if they are not to break in service with heavy palletised loads for which the present invention is intended. It is believed that maintenance of the cables in this type of system as disclosed in U.S. Pat. No. 3,272,358 would be difficult as regards reeving replacement cables around the pulleys when cable breakage occurs. Furthermore, there are considerable assembly problems in reeving the ropes around pulleys and under the vehicle and splicing their ends together on the vehicle, and extreme difficulties with maintenance when the ropes break requiring access to the underneath of the floor of the vehicle.

Closed loop cable breakage has been found to be a serious problem, especially when the loop passes round a number of small diameter of pulleys and turn back on themselves. Cable splicing, particularly in the case of wire ropes, involves specialist know-how and skills. It is believed that such an operation could not be achieved, so to speak, on the vehicle or transfer station.

The loading and unloading platform according to the invention is particularly, but not exclusively, adopted for use as a transfer station. The transfer station may be in the form of a concrete permanent structure with no access for the underneath of the platform. Thus, cable systems which employ cables passing under the platform are totally unsuitable for this application. Of course, in the case of a platform which does have access underneath the system as in the case of a vehicle floor according to the invention is still advantageous since this access may be difficult and hinder assembly of the cables and replacement.

Suitable splicing of wire ropes sufficient to convey heavy palletised loads without the cable unravelling in the region of the splice or failing through fretting or fatigue seems difficult, if not impossible, if carried out on or under the vehicle. If the closed loops are spliced under factory conditions as sub-assemblies, it is difficult to see how they could be fitted to the vehicle or transfer station in the case of the known conveyors previously referred to.

SUMMARY OF THE INVENTION

It is an object of the present invention to overcome the aforesaid disadvantages of moving bulkhead systems with tracks in the floor to drive the bulkheads and systems where there are serious assembly and maintenance problems due to the cables passing underneath the vehicle platform.

According to the present invention there is provided a load transfer apparatus including flexible elements joined together end-to-end to form a plurality of elongate closed loops, driving means extending through one end of the loops, an idler pulley system extending through the other end of the loops operable to apply tension to the loops, a load platform over which the sides of each loop are adapted to pass in opposite directions, and guide support means operable to laterally separate the sides of each loop moving in the required direction from the other sides and support them in contact with a load.

In a preferred aspect of the invention a further idler pulley system is positioned so that the loops travel over the pulleys of the further idler system as received from the driving means.

The pulleys of the idler pulley system and further idler pulley system have a larger diameter for the load-carrying part of the loop than the diameter for the non-load carrying part of the loop.

In a preferred embodiment, the load carrying part of the loop is in greater tension than the other part.

Preferably, the closed loops are spaced apart by guide and support means attached to the top surface of the platform.

The guide and support means in a preferred embodiment comprises a strip of low-friction plastic material attached to the top surface of the platform having two grooves formed therein in which the cables run on the upper surface of the platform.

The guide and support means may be of steel or other suitable material to withstand wire rope wear.

The guide and support means in a preferred embodiment is formed with parallel spaced recesses, one deeper than the other, the load-carrying part of the loop extending along the shallow recess so that the loops in tension extend above the surface of the strip to engage in frictional contact with the load, and the part of the loop in lower tension or non-loaded parts of the loop lies in the deeper recess so as to be out of contact with the load.

In a preferred embodiment of the invention, the flexible elements are closed wire rope loop cables and the idler pulley system remote from the driving means is attached to tensioning means whereby the distances between the winding means and idler pulley system is maintained and adjusted such as to provide the necessary tension for driving the cables and the load and to accommodate the elastic stretch of the wire rope cables or stretching which may occur in use.

The tensioning means and the idler pulley system remote from the winding means may be manually adjustable so as to facilitate assembly and positioning the closed loop cable over the pulleys and over the platform before tensioning.

A preferred cable floor conveying system for a transfer station having separate cable loops joined end-to-end includes a raised platform, driving means at one end of the platform and positioned underneath the level of the platform or, if convenient, under the platform, an idler pulley system at the opposite end of the platform remote from the driving means and an additional idler pulley system over which cables pass from the winding means, both the idler pulley system and the further idler pulley system being positioned at opposite ends of the platform in such a way that all parts of the closed loops pass between the pulley system via the top surface of the platform.

The tension means preferably takes the form of an hydraulic unit having a rod attached to a tensioner pulley adapted to move the idler pulley system to maintain sufficient tension whereby the driven pulley will pull the cables without undue slipping.

According to yet another aspect of the invention, a method of assembling wire rope cables to a loading and unloading apparatus including a platform and driving means to pull the cables over the platform to carry the load, said method of assembling cables including the steps of preparing a number of cable closed loops by splicing together the ends of each cable to stand a breaking strain of between five and ten tons, moving an idler pulley system at one end of the platform towards the driving means to reduce the distance therebetween, passing the wire cable loop over each pulley of the said idler pulley, pulling the loop across the top of the platform over further idler pulleys at the other end and around the driving means, and finally moving the idler pulley system centers away from the driving means so that the cables are tight and tensioned for driving the cables.

Preferably, the wire rope cable ends are spliced together in such a way that the splicing is effected over a length which may be of the order of a third of the length of the finished loop without substantial increase of external diameter over the region of the splice as compared with the cable either side of the splice, in order to achieve an acceptable operating life and avoid frequent breakages.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of example by reference to the accompanying drawings which are given by way of illustration only, and thus are not limitative of the present invention and in which:

FIG. 1 shows a diagrammatic side view of the loading and unloading platform according to the invention;

FIG. 2 shows a plan view of the upper surface of the platform typically showing the array of cables that would be required for heavy loads and compatible with standard pallets and palletised containers.

DETAILED DESCRIPTION OF THE PREFERRED EMBODIMENT

Figure 3:
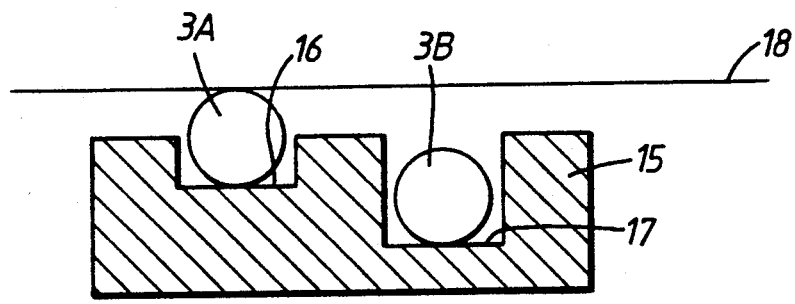
FIG. 3 which shows a cross-section of one preferred form of cable guide and support means for mounting on the top of the platform showing the guidance for the load-carrying part of the loop and the lower recess for the non-loaded part of the loop which is in contact with the load.

Referring to the drawings, FIG. 1 shows loading and unloading apparatus comprising a platform 1 for the load (not shown). The platform 1 is supported above the ground by legs 2, only two of which are shown. The platform may be installed on a concrete dock or elevated floor or in a pit and not require legs. The direction in which the load is to be moved is shown by the arrow X, for example. A flexible wire rope is spliced to form a closed loop 3 as will be explained in more detail later. For simplicity, the driving of a single closed loop will be described, but it is to be understood that a further seven such loops may be required to serve the platform 1 as shown diagrammatically in FIG. 2.

An hydraulic motor 4 is connected by a chain drive 5 to a reduction unit 6. The reduction unit 6 is driven by a chain drive 7. A number of pulleys are shown generally at 8 referred to hereafter as "driving means". Although not shown, it is to be understood that a number of such driving or winding pulleys are secured to a shaft extending transversely under the platform 1, one driving pulley being provided for each of the closed loop wire cables indicated in FIG. 2. Idler pulleys 9 and 10 are positioned fore and aft of the platform 1 respectively, the idler pulley system 9 taking the wire rope from the driving pulleys 8. The idler pulleys 9 are attached to a shaft extending across the width of the platform 1. Similarly, the idler pulleys 10 are connected to a shaft (not shown) extending across the platform as indicated diagrammatically in FIG. 2.

The idler pulley systems 9 and 10 are supported by and connected to the platform 1 (not shown). Pulley systems 9 and 10 are identical and comprise, in effect, separate pulleys $9a$ and $9b$, and $10a$ and $10b$, mounted on a shaft. The pulley $9a$ has a smaller radius than the pulley $9b$, and similarly, $10a$ and $10b$. The larger pulleys $9b$ and $10b$ carry the part of the loops supporting the load. The smaller pulleys $9a$ and $10a$ carry the part of the loops which are not in contact with the load and hence not supporting it. The pulleys $9a$ and $9b$, as well as $10a$ and $10b$, are spaced apart axially in order to transversely space apart the load-carrying parts of loops while they run parallel to one another across the platform, and space apart the non-load carrying part of each loop from the load-carrying part.

An hydraulic tensioning device 13 is shown attached to a pulley wheel 14 but could equally well be attached to the shaft of the idler pulley 10 so that the tensioning device 13 can suitably control the tension in all the cable loops. The load-carrying part of the loops may be slightly inclined with respect to each other. Other tensioning devices, such as pneumatic devices, may be attached.

The shaft of the idler pulley system 10 is also manually adjustable so as to shorten the distance between the pulley system 10 and pulley system 9 to enable the wire rope loops to be readily fitted over the idler pulley system 10, over the platform 1, over the further idler pulley system 9 and around the driving pulleys 8. This also enables the wire rope loops to be readily fitted over the pulleys and winding means for replacement when eventually worn out or in case of accidental damage.

A bearing support and guidance strip 15 for each closed loop cable 3 is shown in FIG. 3 in cross-section and is fixed to the top surface of the platform 1. This strip 15 may extend for the length of the platform 1 for each loop 3 or at spaced stations along the length of the platform 1.

The support and guidance strip 15 has a shallow recess 16 to accommodate the driving of the load-carrying part of the wire loop 3a so that the wire extends above the recess and drives the load. The recess 17 spaced parallel from the recess 16 which has a depth such that part 3b of the cable may lie below the upper surface of the support strip or such that the part 3b of the cable lies below the part 3a and out of contact with the load.

The support and guidance strip is made from a plastic or other suitable material to operate as a sliding bearing for the wire rope loops 3 and to guide the wire rope loop separately across the top of the platform while maintaining one of these parts of the loops against the load to support and move it as appropriate.

The part of the wire rope loop lying in recess 16 is slightly higher than the part of the wire rope loop running in recess 17. The higher part of the loop carries the load in the direction X and is in increased tension, since the wire rope is being pulley around the driving means 8. The lower part of the loop moves in the opposite direction and is not load-carrying since it is not in contact with the load and this part of the loop is in lower tension. The line 18 indicates the load in contact with wire loop 3a.

The wire rope is formed in the closed loops by splicing. Splicing is at present the most effective method of joining wire ropes, but other non-splicing methods may be suitable in some circumstances. Since the loop has to be passed around idler roller systems 9 and 10 and the winding pulleys 8, this imposes a reversal of direction of wire rope travel and particular attention needs to be paid to the splicing operation if the wire rope is not to break or unravel frequently during the operation of the loading and unloading apparatus. Thus, the splicing cannot normally be carried out on the vehicle. Splicing of wire rope cables involves interleaving individual strands of wire of which the cable is composed in such a way that the spliced region may extend up to 30% of the length of the finished closed wire rope loop.

The spliced wire rope loops 3 are placed around the pulleys 10, over the top of the platform 1 in the recesses 16 and 17 of each support strip 15 round the idler pulleys 10 and 9 respectively and over the driving pulley system 8. This is facilitated by adjustment of the pulley system 10 so as to be able to reduce the distance between idler pulleys 10 and driving means 8 and allow the rope to be dropped easily over driving means 8 before tightening up. Operating tension supplied by the tensioning device 13 is sufficient to provide friction on the cable drive from the driving pulleys 8.

The operation of the loading and unloading apparatus will now be described with reference to FIG. 1. Although the operation will be described by referring to a single wire rope loop 3, it will be understood that each wire rope loops indicated in FIG. 2 are driven and guided alternately in less tension and maximum tension in the same way.

The spacing of the load-carrying part of the cables is determined by the shape of the load.

Thus, the vehicle is backed up towards the end of the platform having the idler pulley system 10 and the load transfers in the direction X on to the warehouse loading bay positioned to continue at the same level. The vehicle floor itself may also have similar cable or other automatic load moving arrangements so that the load can be brought from the front end of the vehicle to the back of the vehicle then pass directly on to the load-carrying cables in the load transferring apparatus of the present invention and on to the unloading bay.

Reversing the direction of drive for the winding pulley 8 means that the load carrying part of the closed loops are in reduced tension, but even so, the load transfer apparatus will function for the transfer of loads from the warehouse to the vehicle with the load-carrying cable in less tension and the non-load-carrying part in maximum tension, that is, the reverse of the unloading situation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A load transfer apparatus comprising flexible elements forming a plurality of closed elongated loops, driving means for propelling each loop, each of the loops having a conveying portion and a return portion forming a conveying path, first and second idler pulley systems, both systems having first and second pulleys for the conveying portion and return portion of each loop, the first pulleys having a diameter different from a diameter of the second pulleys and the first and second pulleys being at each end of the conveying path and having a common axes of rotation, a load platform over which the conveying and return portions of each loop pass in opposite directions, and guide support means for separating the conveying portion of the loop from the return portion of the loop, both portions being positioned above the axes of the first and second pulleys and for supporting the conveying portion of at least one loop in contact with a load.

2. The load transfer apparatus as claimed in claim 1, wherein the first idler pulley system is positioned so that the loops travel over the pulleys of the first idler pulley system as received from the driving means.

3. The load transfer apparatus as claimed in claim 1, wherein the first pulleys of the first and second idler pulley systems have a larger diameter for the conveying portion of the loop than the diameter of the second pulleys for the return portion of the loop.

4. The load transfer apparatus as claimed in claim 1, wherein the closed loops are spaced apart by the guide support means, the guide support means being attached to the top surface of the platform.

5. The load transfer apparatus as claimed in claim 1, wherein the guide support means comprises a strip of low-friction plastic material attached to the top surface of the platform, the guide support means having two grooves formed therein for each of the loops, the conveying portion and return portion of each loop running in the grooves on the upper surface of the platform.

6. The load transfer apparatus as claimed in claim 4, wherein the guide support means is formed with generally parallel spaced recesses, one of the recesses being deeper than the other recess, the conveying portion of the loop extending along the shallow recess above the surface of a strip of the guide support means to frictionally engage the load, and the return portion of the loop lying in the deeper recess so as to be out of contact with the load.

7. The load transfer apparatus as claimed in claim 1, wherein the flexible elements are closed loop wire rope cables and second the idler pulley system being attached to tension means for tensioning the cables, whereby distances between the driving means and the second idler pulley system are maintained to provide necessary tension for driving the cables and the load and to accommodate at least one of elastic stretch of the wire rope cables and stretching occurring in use.

8. The load transfer apparatus as claimed in claim 7, wherein the second idler pulley system is manually adjustable to reduce distance between the first and second idler pulley systems so as to facilitate assembly and positioning of the closed loop wire rope cable over the idler pulleys and over the platform before tensioning.

9. A cable floor load conveying system for a transfer station having separate cable loops comprising, a raised platform, driving means for driving the cable loops, each of the loops having a conveying portion and a return portion forming a conveying path, the driving means being positioned at one end of the platform, a first idler pulley system at an opposite end of the platform remote from the driving means and a second idler pulley system over which the cables pass from the driving means to the first idler pulley system, the second idler pulley system being positioned at an opposite end of the platform from the first idler pulley system whereby the conveying portion and return portion of the closed loops pass between the first and second idler pulley systems via the top surface of the platform, both the first and second idler pulley systems having a pair of pulleys for each closed loop, a first pulley of each pair being a different diameter than a second pulley of each pair, and the first and second pulleys of the first idler pulley system being coaxial and the first and second pulleys of the second idler pulley system being coaxial, the conveying portion and return portion of the loops being positioned above the axes of the first and second pulleys.

10. A method of assembling and operating wire rope cables for a loading and unloading apparatus, the apparatus including a platform, driving means for pulling the cables over the platform to carry the load, a first idler pulley system at an end of the platform having the driving means, a second idler pulley system at an opposite end of the platform and guide support means having two recesses defined therein for each of the cables, said method of assembling cables includes the steps of providing each of the first and second idler pulley systems with a pair of pulleys for each of the loops, a first pulley of each pair being a different diameter than a second pulley of each pair and the first and second pulleys of the first idler pulley system being coaxial and the first and second pulleys of the second idler pulley system being coaxial, preparing a number of cable closed loops by splicing together ends of each cable to stand a breaking strain of between five and ten tons, moving the second idler pulley system at the opposite end of the platform towards the driving means to reduce the distance therebetween, passing the wire cable loop over each pulley of the idler pulley second system, pulling the loop across the top of the platform and over each pulley of the idler pulley systems, the loops on the platform being positioned above the axes of the pulleys of the first and second idler pulley systems, separating each side of the closed loops on the top of the platform with a continuous wall of the guide support means, the wall of the guide support means being positioned between the sides of each closed loop, placing a majority of one side of the closed loop in one of the recesses and placing a majority of the other side of the closed loop in the other one of the recesses during the step of separating, and moving centers of the second idler pulley system away from the driving means to tighten and tension the cables for driving the cables.

11. The method of assembling cables to a loading and unloading apparatus as claimed in claim 10, wherein the splicing of the wire rope cable ends is effected over a length in the order of a third of the length of the finished loop to achieve an acceptable operating life and to avoid frequent breakages of the loop.

12. The load transfer apparatus as claimed in claim 1, wherein the guide support means comprises a pair of recesses separated by a wall for each of the loops, each of the recesses having bottoms and the walls and bottoms of the recesses being nonmovable and fixed relative to the top of the load platform, one of the recesses receives a conveying portion of the loop and the other of the recesses receives the return portion of the loop and a majority of the sides of the loops being supported by the bottoms of the two recesses, each of the walls having a generally horizontal top and the bottoms of the one recesses being located a different distance from the top of the wall than the bottoms of the other recesses.

13. The load transfer apparatus as claimed in claim 12, wherein the top of each wall is generally flush with the top of the guide support means and wherein the conveying portion of the loops is positioned partially above the top of the guide support means while the return portion of the loops is positioned totally beneath the top of the guide support means.

14. The load transfer apparatus as claimed in claim 1, wherein the driving means extends through one end of each of the loops.

15. The load transfer apparatus as claimed in claim 1, wherein the driving means is positioned below the guide support means and is fixed relative to the guide support means.

16. The load transfer apparatus as claimed in claim 1, wherein the first and second pulleys of both the first and second idler pulley systems alternate along the common axis of rotation such that a first pulley is positioned next to a second pulley and wherein the guide support means has two sides, the first idler pulley system being at a first end of the guide support means and the second idler pulley system being at a second end of the guide support means, the conveying path extending over the guide support means and the loops extending past both ends of the guide support means and beyond at least one of the first and second idler pulley systems.

17. The cable floor load conveying system as claimed in claim 9, wherein the guide support means further includes a wall with one recess defined adjacent each side thereof, each of the two recesses having bottoms and the walls and bottoms of the recesses being nonmovable and fixed relative to the top of the load platform, and each of the loops having one of the walls located along the conveying portion and return portion thereof.

18. The cable floor load conveying system as claimed in claim 17, wherein one of the recesses on one side of each wall receives the conveying portion of the loops and another of the recesses on another side of each wall receives the return portion of the loops such that a majority of the first and second loops on the guide support means is supported by the bottoms of the two recesses, the guide support means having a generally horizontal top and the bottoms of each of the one recesses being located a different distance from the top of the guide support means than the bottoms of each of the another recesses.

19. The cable floor load conveying system as claimed in claim 18, wherein each wall has a top which is generally flush with the top of the guide support means and wherein the conveying portions of the loops are positioned partially above the top of the guide support means while the return portions of the loops are positioned totally beneath the top of the guide support means.

20. The method of assembling cables to a loading and unloading apparatus as claimed in claim 10, wherein each of the recesses has a bottom and wherein each bottom of the recesses and each wall are nonmovable and fixed relative to the top of the platform, each wall having a top which is flush with the top of the guide support means and the top of the guide support means being generally horizontal, the method further comprising the step of exposing the conveying portion of the closed loop above the top of the guide support means during the step of placing, the step of partially enclosing all of the return portion of the closed loop beneath the top of the guide support means during the step of placing and the step of supporting a majority of the closed loop with the bottoms of the recesses.

* * * * *